C. HERTZIG.
LAWN-RAKE.

No. 180,131. Patented July 25, 1876.

WITNESSES
Od. F. Nottingham,
A. H. Bright.

INVENTOR
Christian Hertzig.
By Deggett and Deggett,
Attorneys

UNITED STATES PATENT OFFICE.

CHRISTIAN HERTZIG, OF CLEVELAND, OHIO.

IMPROVEMENT IN LAWN-RAKES.

Specification forming part of Letters Patent No. 180,131, dated July 25, 1876; application filed June 22, 1876.

*To all whom it may concern:*

Be it known that I, CHRISTIAN HERTZIG, a resident of Cleveland, in the county of Cuyahoga and State of Ohio, have invented certain new and useful Improvements in Lawn-Rakes; and I do hereby declare the following to be a full, clear, and exact description of the invention, such as will enable others skilled in the art to which it pertains to make and use it, reference being had to the accompanying drawings, which form part of this specification.

My invention relates to an improvement in lawn-rakes; and consists in the peculiar shape of the teeth, and in the relative position which the teeth and handle occupy to each other.

Figure 1:
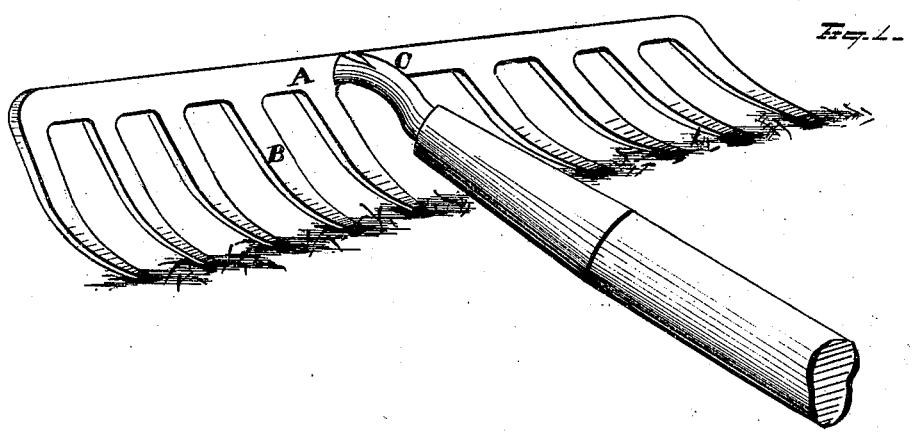
Figure 2:
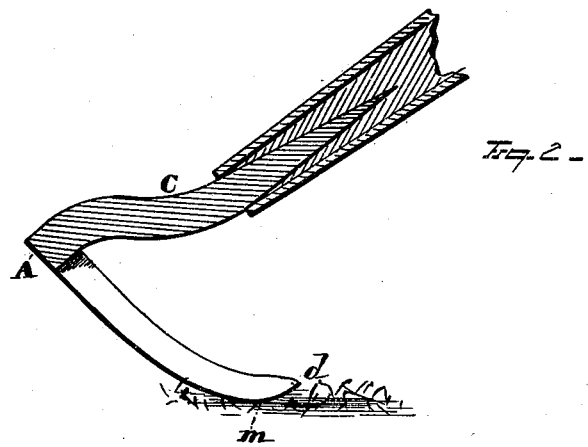

Figure 1 of the drawing represents the rake in isometrical projection. Fig. 2 is a transverse section, showing the curvature of the teeth and the relative position thereto of the handle.

A is a bar from which the teeth B project, or to which they are fixed. C is the curved prong projecting from about the center of the bar A, and to which the handle of the rake attaches. The teeth B are straight for about one-third of their length, and curved for the remainder, as shown in the drawing. The front and rear plane of each tooth meet in a line at $d$. The side planes taper each to a point, which points are separated a distance equal to the length of said line $d$, which connects them. The taper of the teeth in width is slight. The prong is curved, as shown, so as to prevent the clogging of the rake, and to increase its carrying capacity.

When this device is in operation the parts $m$ of the teeth are in contact with the ground, while the ends or points $d$ are elevated. The teeth thus act as runners, sliding on parts $m$. The handle is attached to the rake at such an angle that the teeth assume the above position when in use.

By this construction and arrangement of parts the teeth do not plow into the ground, and thus tear up the roots. The rake is evidently easier to operate, requiring less expenditure of force, is far less subject to wear and tear, and is greatly less liable to need renewal in its parts.

The practical operation of the device is very satisfactory, and the inventor believes that it is several times more durable than the ordinary lawn-rake.

What I claim as my invention, and desire to secure by Letters Patent, is—

1. In a rake, the combination of the handle and curved teeth B, the points of the latter constructed to be elevated above the surface of the ground when the rake is in operation, substantially as and for the purpose described.

2. The combination of the curved teeth, curved prong, and handle, the points of the teeth being elevated above the surface of the ground when the rake is in operation, substantially as and for the purpose specified.

In testimony whereof I have signed my name to this specification in the presence of two subscribing witnesses.

CHRISTIAN HERTZIG.

Witnesses:
 FRANCIS TOUMEY,
 EDWARD WALSH.